United States Patent [19]

Aoshima et al.

[11] Patent Number: 4,687,910
[45] Date of Patent: Aug. 18, 1987

[54] CIRCUIT FOR CONTROLLING AND DISPLAYING COOKING STATES OF A RICE COOKER

[75] Inventors: Terutaka Aoshima, Toyohashi; Morio Asahi, Gifu; Masahiro Imai; Ryuuho Narita, both of Nagoya, all of Japan

[73] Assignee: Kabushiki Kaisha Toshiba, Kawasaki, Japan

[21] Appl. No.: 846,089

[22] Filed: Mar. 31, 1986

[30] Foreign Application Priority Data

May 10, 1985 [JP] Japan .................................. 60-100321

[51] Int. Cl.$^4$ ............................................ H05B 1/02
[52] U.S. Cl. .................................... 219/506; 219/492; 219/486; 99/342; 340/650; 340/660
[58] Field of Search ................ 219/10.55 B, 492, 497, 219/507–509, 483, 486, 501, 506; 99/342, 328, 330, 331; 340/687, 660, 661, 650

[56] References Cited

U.S. PATENT DOCUMENTS

| 4,278,872 | 7/1981 | Koether et al. | 219/506 |
| 4,309,585 | 1/1982 | Doi et al. | 219/506 |
| 4,343,990 | 8/1982 | Ueda | 219/506 |
| 4,350,858 | 9/1982 | Yoshida | 219/506 |

Primary Examiner—M. H. Paschall
Attorney, Agent, or Firm—Cushman, Darby & Cushman

[57] ABSTRACT

A circuit for controlling a rice cooker has at least one heater used for heating a cooking pot. This circuit comprises a temperature detection element capable of detecting the temperature of the pot; a converter, connected to receive a detection signal from the temperature detection element, for converting the received signal to a specified electrical signal; a selector, connected to receive an electrical signal from the converter, for producing a first or second selection signal based on whether the value of the electrical signal is or is not within a specified range; and a display capable of displaying a plurality of cooking operation states. This circuit further includes a first controller which receives the first selection signal and supplies to the heater specified turn-on control signals for dividing the cooking operation into a plurality of states and sequentially performing each cooking operation. The controller also supplies display control signals for dividing the cooking operation into a plurality of states corresponding to the turn-on control signals and sequentially indicating these states. A second controller receives the second selection signal and supplies to the display model display control signals which divides the cooking operation into a plurality of states and displays the states.

7 Claims, 8 Drawing Figures

CIRCUIT FOR CONTROLLING AND DISPLAYING COOKING STATES OF A RICE COOKER

BACKGROUND OF THE INVENTION

This invention relates generally to a circuit for controlling a rice cooker and particularly to a circuit for controlling a rice cooker using a microprocessor.

With the conventional microcomputer-controlled rice cooker, control of the normal steps of soaking, cooking, supplemental cooking and warming, etc. are carried out based on a program, and each step is shown on a display. An explanatory program, which is a copy of the normal steps of the rice cooker, is stored in the microcomputer and a shunt connector is provided in a special section of the rice cooker. The shunting operation of the connector makes it possible to indicate the steps of soaking, cooking, and supplemental cooking and warming, without turning on the cooking heater and warming heater, resulting in a faster display of the steps. This is advantageous for sales personnel, who describe the operation of the rice cooker, when trying to sell the rice cooker in the stores.

With the above conventional structure, one input port of the microcomputer is used exclusively for selection of the explanatory program. This requires a microcomputer with many input ports and a special shunt connector, which increases the total cost of the device.

SUMMARY OF THE INVENTION

It is, therefore, an object of the present invention to provide a new and improved circuit for controlling a rice cooker which is capable of, at a low cost, displaying a copy of the cooking operation on a display without using a special, sophisticated control circuit and a special shunt connector.

In brief, in order to achieve the object of the invention, a temperature detection circuit outputs a temperature detection signal in response to the electrical resistance of a temperature detection element connected to the temperature detection circuit via a connector. A control circuit is also provided for effecting the cooking operations in response to the temperature detection signals based on the operation of the operating means. This control circuit is constructed such that when the temperature indicated by the temperature detection signal is determined to be outside the range of the temperature normally indicated during cooking, a copy of the cooking operation is displayed without performing the actual cooking operation.

According to the present invention, there is provided a circuit for controlling a rice cooker having at least one heater used for heating a cooking pot, the circuit comprising:

a temperature detection element capable of detecting the temperature of the cooking pot;

a converter connected so as to receive a detection signal from the temperature detection element for converting the received signal to a specified electrical signal;

a selector connected so as to receive an electrical signal from the converter for producing a first or second selection signal based on whether the value of the electrical signal is within or without a specified range;

a display capable of displaying a plurality of cooking operation states;

a first control which receives the first selection signal and supplies to the heater specified turn-on control signals for dividing the cooking operation into a plurality of states and sequentially performing each cooking operation, and which supplies display control signals for dividing the cooking operation into a plurality of states corresponding to the turn-on control signals and sequentially indicating these states; and a second control means, which receives the second selection signal and supplies to the display model display control signals which divide the cooking operation into a plurality of states and displays the states.

BRIEF DESCRIPTION OF THE DRAWINGS

These and other objects and features of the present invention can be better understood by reference to the accompanying drawings, in which.

DETAILED DESCRIPTION OF THE PREFERRED EMBODIMENT

The embodiment of the invention is described with reference to the drawings.

Figure 1:
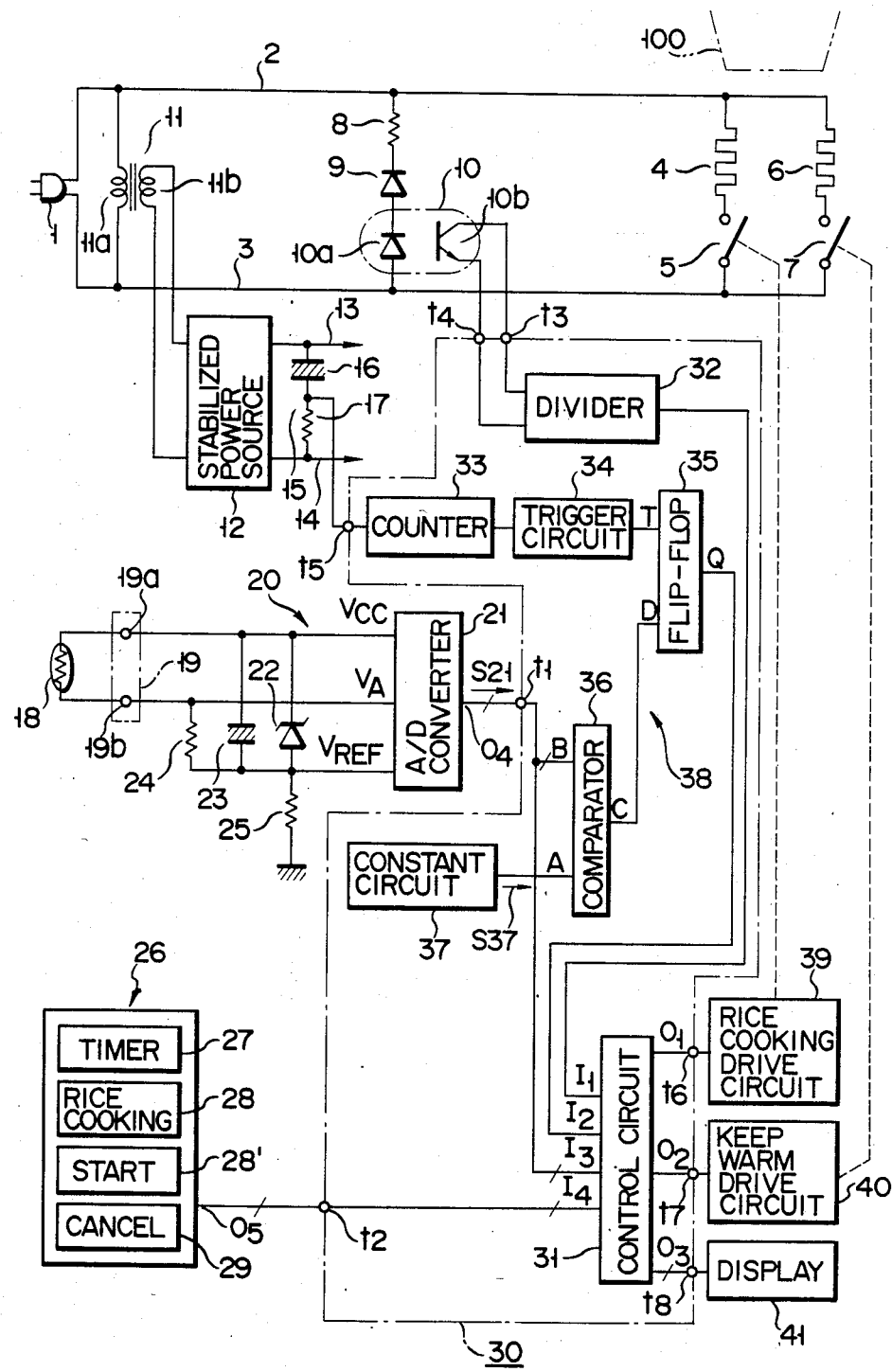
FIG. 1 is a circuit diagram of the control circuit for a rice cooker according to an embodiment.

In FIG. 1 reference numeral 1 denotes an electrical plug, which is plugged into a single phase AC electrical outlet (not shown) and its two terminals connected to AC lines 2 and 3. Cooking heater 4, for heating a cooking pot 100, and cooking switch 5 (described later) are connected in series between AC lines 2 and 3. Warming heater 6, for warming the cooking pot 100, and warming switch 7 (described later) are connected in series between AC lines 2 and 3. Resistor 8, display polarity diode 9 and photocoupler 10, which comprises display polarity diode 10a, are also connected in series between AC lines 2 and 3. Reference numeral 11 denotes a stepdown transformer whose primary coil 11a is connected between AC lines 2 and 3 and whose secondary coil 11b terminals are connected to the input terminal of a conventional stabilized DC power source circuit 12 the output terminals of which are also connected to DC lines 13 and 14. Capacitor 16 and resistor 17, which comprise power detection circuit 15, are connected in series between DC lines 13 and 14.

Reference numeral 18 denotes a thermistor, which serves as the temperature detecting element, and whose two terminals are connected to terminals 19a and 19b of connector 19. Thermistor 18 detects the temperature of the outside bottom of pot 100 and has the negative heat/resistance characteristics shown in FIG. 3. Reference numeral 20 denotes the temperature detection circuit in which source terminal Vcc and input terminal VA of A/D converter 21 (analog/digital) are connected to terminals 19a and 19b of connector 19. Constant voltage diode 22 of display polarity is connected between source terminal VCC and voltage reference terminal VREF, and a capacitor 23 is connected in parallel to diode 22. Resistor 24 is connected between input terminal VA and terminal VREF, which is connected to ground via resistor 25.

Operation panel 26 includes timer button 27, cooking button 28, start button 28' and cancellation button 29, whereby a timer signal, a cooking signal, a start signal or a cancellation signal is output on a multibit output terminal O5.

Reference numeral 30 denotes a microcomputer for which only the parts relating to this invention are shown as function blocks. Control circuit 31 stores the first program for the normal cooking operation and the second program for instructional purposes. Control circuit 31 includes input terminals I1 and I2, multibit input terminals I3 and I4, as well as output terminal O1 and O2 and multibit output terminal O3. Input terminal I3 is connected to multibit input port t1, and input terminal I4 is connected to multibit input port t2. Input port t1 is also connected to multibit output terminal O4 of A/D converter 21, and input port t2 is also connected to multibit output terminal O5 of operation panel 26.

The input terminal of divider 32 is connected to input ports t3 and t4, and the output terminal is connected to input terminal I1 of control circuit 31. Input ports t3 and t4 are connected respectively to the collector and emitter of phototransistor 10b which comprises photocoupler 10.

Counter 33 counts a prescribed time (for example 1 second). The input terminal of counter 33 is connected to input port t5, and the output terminal is connected to the input terminal of trigger circuit 34, whose output terminal is connected to trigger terminal T of D flip flop circuit 35 which functions as the state detection circuit. Input port t5 is connected to the common node of capacitor 16 and resistor 17. This means that power detection circuit 15 is comprised of a differential circuit.

Reference numeral 36 denotes a comparator whose terminal A is connected to constant circuit 37. Multibit input terminal B of comparator 36 is connected to input port t1 and output terminal C is connected to data input terminal D of flip flop circuit 35, whose output terminal Q is connected to input terminal I2 of process control circuit 31.

Constant circuit 37 is constructed such that it outputs a temperature setting signal S37 of a temperature equivalent to the order of 10 ohms, as indicated by thermistor 18. Comparator 36 compares temperature setting signal S37 supplied via input terminal A with temperature detection signal S21 supplied to input terminal B from A/D converter 21. If, as a result of this comparison, it is determined that the temperature indicated by temperature detection signal S21 is larger than the temperature indicated by temperature setting signal S37, or if they are the same (S21≧S37), the output signal from output terminal C of comparator 36 goes to high level from low level in (S21<S37).

Flip flop circuit 35, comparator 36 and constant circuit 37 constitute program selector 38.

Microcomputer 30 has output ports t6, t7 and multibit output port t8. Output port t6 is connected to output terminal O1 of control circuit 31 and to the input terminal of cooking drive circuit 39. Output port t7 is connected to output terminal O2 of process control circuit 31 as well as to the input terminal of warming drive circuit 40. Output port t8 is connected to output terminal O3 of control circuit 31 and to the input terminal of display 41. When a high level signal is applied to the input terminal of cooking drive circuit 39, cooking switch 5 is turned on. When a high level signal is applied to the input terminal of warming drive circuit 40, warming switch 7 is turned on.

Figure 2A:
FIGS. 2A-2F are frontal views of the different display states of the display device according to the embodiment.
Figure 2B:
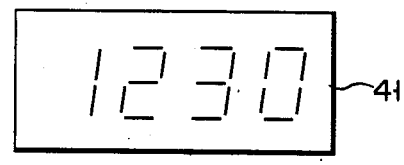
Figure 2C:
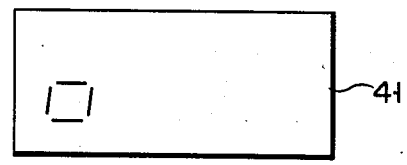
Figure 2D:
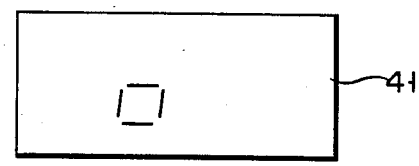
Figure 2E:
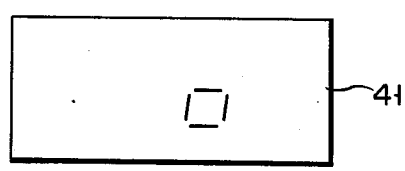
Figure 2F:
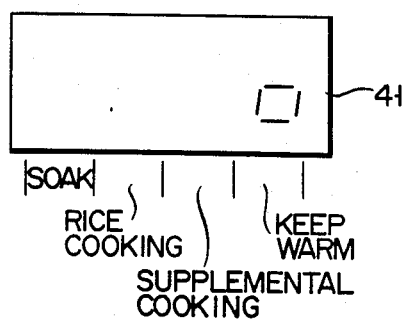

As shown in FIG. 2A, display 41 is a four-digit seven-segment display and, as shown in FIG. 2F, under each digit are the words SOAK, RICE COOKING, SUPPLEMENTAL COOKING and KEEP WARM.

The following is a description of the operation of the above embodiment based on FIGS. 2A to 2F and FIG. 1.

First, pot 100 is filled with a prescribed amount of rice and water and is turned on by inserting plug 1 into the outlet. The AC voltage that is then supplied through AC lines 2 and 3 is stepped down by transformer 11, rectified and stabilized by stabilized power source 12, and supplied to DC lines 13, 14 and to each of the circuits as a DC voltage. Light emitting diode 10a of photocoupler 10 emits light for each negative half period of the AC voltage supplied through power lines 2 and 3 to thereby periodically turn photodiode 10b on and off. Accordingly, this constant period signal is supplied via input ports t3 and t4 to divider 32, which divides the signal by a prescribed number and generates a clock pulse, which is supplied to input terminal I1 of process control circuit 31.

Figure 3:
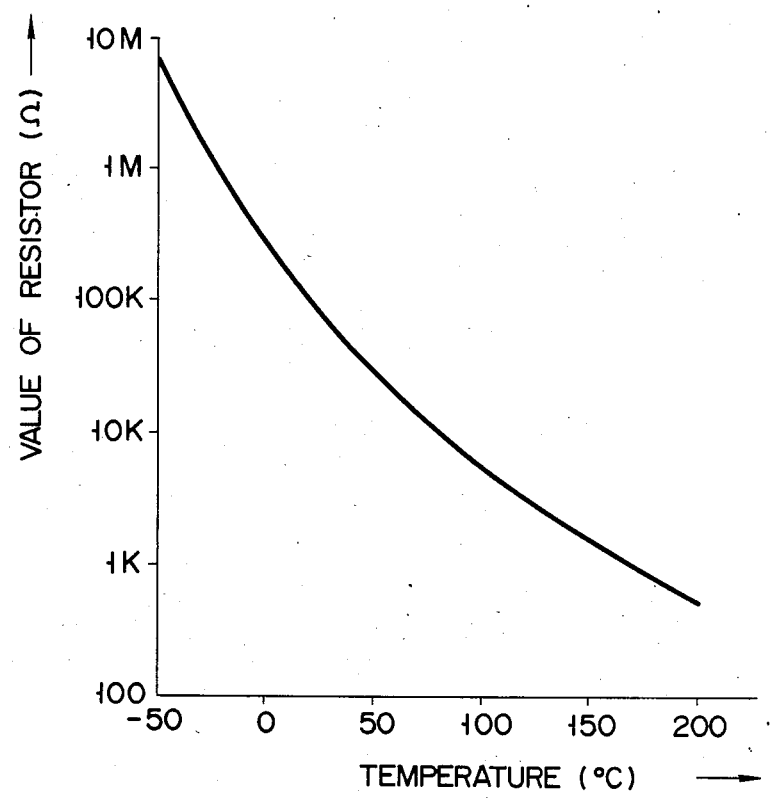
FIG. 3 shows the resistance/temperature relationship of the thermistor used in the embodiment.

Also, when the power is turned on, thermistor 18 senses the normal temperature but, as is clear from FIG. 3, the resistance at this time is much more than 10 ohms. Accordingly, the temperature indicated by temperature detection signal S21 output from A/D converter 21 is lower than the temperature indicated by temperature setting signal S37 output from constant circuit 37 (S21<S37), so the level of the output signal from comparator 36 is low.

On the other hand, when a DC voltage is supplied through DC lines 13 and 14, power detection circuit 15 generates a differential pulse which is supplied via input port t5 to counter 33 where, for example, 1 second is counted. The counted up signal is supplied to trigger circuit 34 which outputs a trigger pulse to flip flop circuit 35. Although not shown, this trigger pulse is also applied to control circuit 31 to initialize the circuit. As this trigger pulse is applied to trigger terminal T of flip flop circuit 35, flip flop circuit 35 stores the high or low level data of the signal applied to the data input terminal D at that time. Accordingly, in this case flip flop circuit 35 stores the low level data and the signal output from output terminal Q of flip flop circuit 35 is of a low level.

This low level signal is supplied to input terminal I2 of control circuit 31. Then, control circuit 31 is enabled based on selector 38 selecting a program which executes the first program for the normal cooking operation. Then, when cooking and start buttons 28 and 28' on operation panel 26 are sequentially depressed, cooking and start signals are sequentially output. Each of these signals are supplied via input port t2 to input terminal I4 of control circuit 31. Control circuit 31 then begins operation based on the normal program.

First, the soaking procedure is performed. In this procedure control circuit 31 outputs a soaking display signal from output terminal O3. This soaking display signal is supplied via output port t8 to display 41 which then displays a square mark at the fourth digit position which corresponds to the word SOAK, as shown in FIG. 2C. Control circuit 31 also outputs a high level signal from output terminal O1 to cooking drive circuit 39 via output port t6. Cooking drive circuit 39 turns on cooking switch 5 and thereby electricity is supplied to cooking heater 4 to heat the rice and water in the pot. Then, temperature detection signal S21 which is output from A/D converter 21 is supplied via input port t1 to input terminal O1 of control circuit 31 which stops outputting a high level signal from output terminal O1.

Accordingly, cooking switch 5 is turned off and cooking heater 4 is turned off.

Similarly, assuming signal S21 is 40° C., control circuit 31 intermittently outputs a high level signal from output terminal O1 in response to the temperature indicated by signal S21 to control cooking heater 4 which, in this case, is maintained at a temperature of 40° C. After this soaking period has been performed for a prescribed period of time, control circuit 31 advances to the next step.

In this step the cooking signal is supplied from output terminal O3 to display 41 which then displays the square mark of the third digit corresponding to the word RICE COOKING, as shown in FIG. 2D. Control circuit 31 continuously outputs a high level signal on output terminal O1 so that cooking switch 5 is continuously turned on in response, electricity is supplied to heater 4 and cooking commences.

The temperature of the pot rises as the rice approaches the cooked state and, when the temperature indicated by signal S21 reaches 140° C., for example, control circuit 31 determines that the rice is cooked and stops outputting a high level signal on output terminal O1. Cooking heater 4 is then turned off. After a prescribed period has elapsed, control circuit 31 advances to the second cooking step.

In this step a second cooking signal is supplied from output terminal O3 to display 41, which then displays the square mark of the second digit corresponding to the words SUPPLEMENTAL COOKING, as is shown in FIG. 2E. Control circuit 31 outputs a high level signal from output terminal O1 for a constant period so that electricity is supplied to heater 4 for that period of time. When this step is completed, control circuit 31 advances to the warming step.

In this step a warming signal is supplied from output terminal O3 to display 41, which then displays the square mark of the first digit corresponding to the words KEEP WARM as shown in FIG. 2F. Control circuit 31 intermittently outputs a high level signal from output terminal O2 based on the temperature indicated by signal S21. This signal is applied to warming drive circuit 40 which intermittently turns on warming switch 7 to control heater 4 and maintain the temperature of the pot at approximately 70° C. If one wishes to end the warming step, cancellation button 29 on operation panel 26 is pressed to send a cancellation signal to process control circuit 31.

If, after the power has been turned on, timer button 27 is pressed, a time setting signal is sent to input terminal I4 of control circuit 31 which then supplies a time setting signal from output terminal O3 to display 41 where the time set by timer button 27 is digitally displayed (in this case 12:30 as shown in FIG. 2B). After this, when start button 28' is pressed, the time counter (not shown) starts counting the time. Control circuit 31 varies the time display signal output from terminal O3 based on this time count so that display 41 shows the time remaining. When the set time has been counted, control circuit 31 starts the cooking process described above. If the time is set longer than a predetermined time, the soaking step is omitted and operation begins from the cooking step.

The following is a description of what happens when a salesman is showing the operation of this rice cooker to customers.

In this case, terminals 19a 19b of connector 19 are short-circuited by a pin or lead wire, etc. When plug 1 is inserted into the electrical outlet without any water or rice being in pot 100, an AC voltage passes through DC lines 13 and 14 and power detection circuit 15 generates a differential pulse. Based on this pulse signal, counter 33 begins the count operation. After a specified count has been reached, trigger circuit 34 outputs a trigger pulse.

As described earlier, during the cooking operation the temperature detected by thermistor 18 is from room temperature up to 150° C. When terminals 19a and 19b of connector 19 are short circuited, the electrical resistance of thermistor 18 drops to a state equal to about zero and, accordingly, the temperature indicated by detection signal S21 from A/D converter 21 is much greater than the temperature range encountered during the normal cooking process. Comparator 36 therefore outputs a high level signal from terminal C based on the temperature indicated by detection signal S21 being larger than the temperature indicated by temperature setting signal S37. Accordingly, when trigger circuit 34 outputs a trigger pulse, flip flop circuit 35 stores a high level signal and a high level signal is output from terminal Q.

This signal is applied to input terminal I2 of control circuit 31 which, in this state, causes selector 38 to select the second program for instructional purposes and executes this program. Based on this program, a high level signal is not applied to cooking and warming drive circuits 39 and 40, and the soaking, cooking, supplemental cooking and warming display signals are supplied from output terminal O3 without electricity being passed through cooking heater 4 and warming heater 6 so that these signals can be output faster than when they are sequentially supplied during a normal cooking operation, resulting in a faster display on display 41 of the states shown in FIGS. 2C to 2F.

In this embodiment, connector 19, which connects temperature detection circuit 20 and thermistor 18, is used, and by short-circuiting this connector, microcomputer 30 determines that the temperature indicated by signal S21 is greatly outside the range of the temperature encountered during the normal cooking operation and executes the explanatory program. Accordingly, there is no need to provide a special input port for the explanatory program and a simpler microcomputer may be used. There is also no need to provide a special shunt connector thereby reducing the total cost.

Also, in this embodiment, when thermistor 18 breaks down and short circuits, display 41 immediately shows the states shown in FIGS. 2C to 2F when the power is turned on so the user is aware that thermistor 18 has broken down.

Also, according to this embodiment, when the explanatory program is executed, connector 19 is short-circuited. However, it is also possible, by removing thermistor 18 in order to release connector 19, for microcomputer 30 to determine that the temperature is much lower than the temperatures encountered during normal cooking operation and to then select and effect the explanatory program.

This invention is not limited to the embodiment described above and shown in the diagrams and various modifications to the invention are possible.

As was described above, with the rice cooker of this invention a connector is used to connect the temperature detection circuit and the temperature detection element. When the temperature indicated by the signal from the temperature detection circuit is outside the normal cooking temperature range, the control circuit causes the normal cooking process to be shown on the display, which eliminates the need for a special connector and for a more complicated microprocessor, which in turn reduces the overall cost.

What is claimed is:

1. A circuit for controlling a rice cooker having at least one heater used for heating a cooking pot, said circuit comprising:

a temperature detection element for detecting the temperature of said cooking pot;

converting means, connected so as to receive a detection signal from said temperature detection element, for converting the received detection signal to a specified electrical signal;

a connector having a pair of terminals connected in parallel between said temperature detection element and said converting means, said pair of terminals being selectively and manually short-circuited so as to bring said circuit into a model cooking operation display control state which differs from a normal cooking operation control state, wherein during said cooking operation display control state the electrical signal from said converting means has a value outside a predetermined range and during said normal cooking operation control state the electrical signal has a value within said predetermined range;

selection means, connected to receive said electrical from said converting means, for producing a first and a second selection signal when said circuit is or is not in said normal cooking operation control state, respectively;

display means for displaying a plurality of cooking operation states;

first control means for receiving said first selection signal and supplying to said heater specified turn-on control signals for dividing the cooking operation into a plurality of states and sequentially performing each cooking operation, and for supplying to said display means display control signals for dividing the cooking operation into a plurality of states corresponding to the turn-on control signals and sequentially displaying these states; and second control means for receiving said second selection signal and supplying to said display means models display control signals for dividing said cooking operation into a plurality of states and sequentially displaying these states.

2. A circuit according to claim 1, wherein said plurality of states are soaking and cooking.

3. A circuit according to claim 1, wherein said plurality of states are cooking and warming.

4. A circuit according to claim 1, wherein said selection means is activated by the supply of electrical power to said circuit.

5. A circuit according to claim 1, wherein said first and second control means are activated by a start command.

6. A circuit according to claim 1, wherein said first and second control means are included in one microprocessor.

7. A circuit according to claim 1, wherein said model display control signals of said second control means are generated at a higher speed than the display control signals of said first control means.

* * * * *